INVENTOR
Karl August Börkey

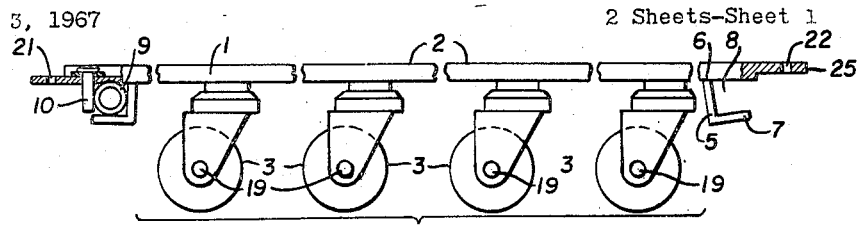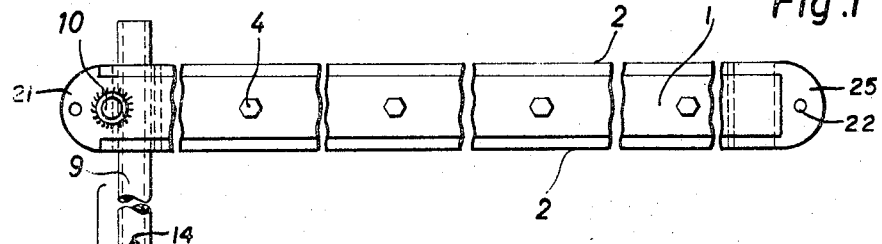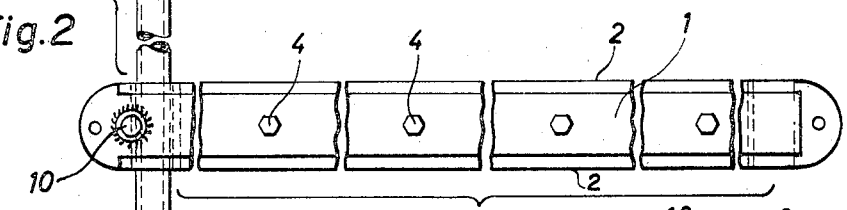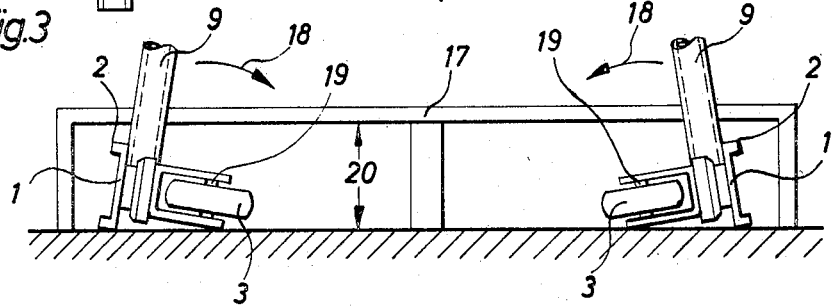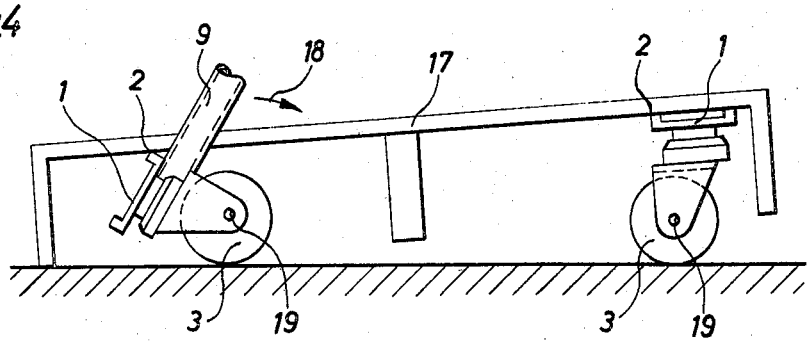

BY Spencer & Kaye
ATTORNEYS

# United States Patent Office 3,480,292
Patented Nov. 25, 1969

3,480,292
LIFTING DOLLY
Karl August Börkey, Hagen, Germany, assignor to Walter Borkey KG., Hagen-Delstern, Germany
Filed Oct. 3, 1967, Ser. No. 672,600
Claims priority, application Germany, Oct. 28, 1966, B 89,601
Int. Cl. B62d 21/14; B66f 3/00
U.S. Cl. 280—43.17     23 Claims

ABSTRACT OF THE DISCLOSURE

A lifting dolly usable as one of a set of dollies for lifting and transporting an object having a predetermined floor clearance. The dolly is capable of being inserted under the object and twisted to lift the object. It comprises a support having two approximately parallel upper edges suitable for carrying the object. These upper edges are spaced apart a given distance which is less than the floor clearance of the object. The dolly also comprises at least one wheel arranged on the bottom of the support. The distance from the bottom of the wheel to the upper edges of the support is greater than the floor clearance of the object. The wheel is rotatable about an axis which, when the dolly is upright, is horizontal and, after the dolly has been twisted to lift the object and stands upright, is parallel to the two upper edges and lies between the two vertical planes passing, respectively, through the outermost part of the two upper edges.

BACKGROUND OF THE INVENTION

The invention relates to a lifting dolly for transporting heavy objects.

One lifting dolly known in the art is used in pairs and consists essentially of an angular frame having an adjustable and lockable wheel arranged thereon. (Prospectus of Kaiser & Kraft GmbH., Solingen-Ohligs, West Germany, Catalog 16, 1966, page 81).

With lifting dollies of this type the goods to be transported must first be lifted up so that one member of the frame may be pushed under the goods beyond the center of gravity. An upright member of the dolly then leans against the side of the goods and, by means of a hand lever connected through a relatively complicated mechanical gear train, the wheel, supported on the upright frame member, is moved downward with respect to the frame to lift the goods to be transported.

SUMMARY OF THE INVENTION

An object of the present invention is to construct a less costly and more robust hand lever-operated lifting dolly of the type described above for lifting and transporting pallets or similar objects which have a predetermined floor clearance.

This, and other objects which will become apparent in the discussion that follows, are achieved according to the present invention by a lifting dolly, for use at least in pairs, which may be inserted under an object having a given floor clearance and twisted, by means of a detachable lever, thereby lifting the object. The dolly is designed so that when carrying an object in the upright position, it will not fall over.

The dolly according to the invention includes a support which has two approximately parallel upper edges suitable for carrying the object to be transported. These edges are spaced a given distance apart which is less than the floor clearance of the object.

The dolly further includes at least one wheel, arranged at the bottom of the support so that the distance from the bottom of the wheel to the top of the upper edges will be greater than the floor clearance of the object. The wheel is rotatable about an axis which, when the dolly is upright, is horizontal. After the dolly has been twisted to lift an object and stands upright and the axis, in addition, has aligned itself parallel to the two upper edges, the axis will always lie between the two vertical planes passing, respectively, through the outermost part of the two upper edges.

In one embodiment of the dolly according to the present invention the carrying surfaces of the upper edges are roughened or toothed so as to increase the friction between the dolly and the object carried. In a variation of this embodiment the carrying surfaces of the upper edges are made of a material such as plastic which has a high coefficient of friction.

In another embodiment of the dolly according to the present invention the upper side of the support is provided with reinforcing ridges which serve as the upper edges. This embodiment may be realized by making the support of a length of channel bar or of two parallel lengths of profile bar spaced apart a given distance and joined together.

In another embodiment of the invention the dolly is provided with a plurality of wheels distributed along the length of the underside of the support, and preferably aligned on the axis of symmetry of the support. According to still another embodiment the wheels can also be casters, which swivel about a vertical axis when the dolly is upright.

In another embodiment of the present invention the dolly support is provided with coupling means for attaching other dolly supports to it, end to end. A tongue is preferably provided at and extending beyond one end of the support and a tongue-fastening means is provided at the other end. In this way the dollies may be coupled by means of the tongue of one dolly and the fastening means of the other. In a particular embodiment of the invention the tongue is made as a specially formed part of the support itself.

In another embodiment according to the invention the lifting dolly support is provided with coupling means for attaching other dolly supports to it side by side. In one form of this embodiment the twisting lever is advantageously employed in dual purpose as part of this coupling means. This dual purpose is preferably realized by providing, in the area of both ends of the dolly support, a twisting lever plug-in coupling with means for detachably holding the twisting lever so that its length is transverse to the length of the support. The means for detachably holding may include a movable plug or pin which can be inserted through the lever in a recess in the lever surface. The plug can be designed so as to be slidable in its axial direction but limited in its motion so that it can not be removed and lost.

In a particular embodiment of the means for coupling dolly supports side by side the plug-in coupling for the twisting lever is an angle bar arranged on the underside of both ends of the support. The edge of one side of the angle bar is attached to the support so that the bar is transverse to the length of the support and so that the other side of the bar will form a mouth with a constricted opening facing toward the end of the support.

In a last embodiment of the lifting dolly according to the present invention the twisting lever includes means approximately equidistant from both its ends by which at least a pair of lifting dollies may be drawn. This drawing means can be an eyelet, a projecting pin or any suitable device.

BRIEF DESCRIPTION OF THE DRAWINGS

FIGURE 1 is a side view of a lifting dolly according to the present invention.

FIGURE 2 is a top view of a pair of lifting dollies arranged side by side in accordance with the present invention.

FIGURES 3 and 4 are elevational views showing the stages of operation in lifting a pallet with lifting dollies constructed according to the present invention.

DESCRIPTION OF THE PREFERRED EMBODIMENTS

Figure 5:
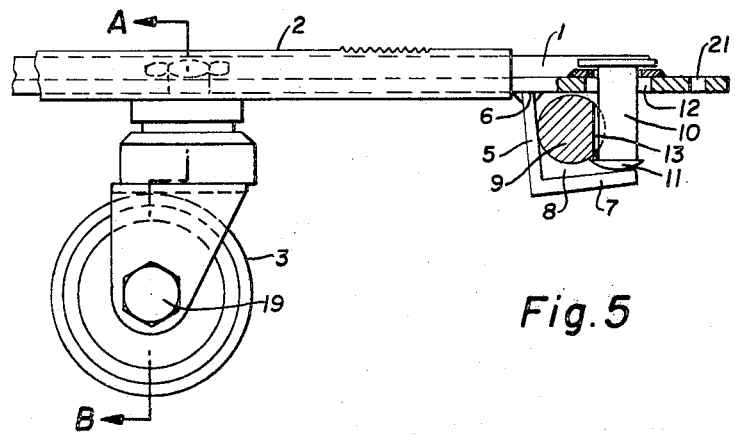
FIGURE 5 is a partially phantom side view of one end of the lifting dolly according to the present invention.

Turning now to the drawings, FIGURE 1 shows the lifting dolly according to the present invention consisting of a support 1 having a U-shaped cross section, the flanged edges of which serve as object-carrying upper edges 2. Four casters 3 are evenly distributed along the length of the underside of the support 1. Each caster is attached to the support by a bolt inserted in a hole positioned along the centerline of the support. The bolt is fastened to the support by means of a nut 4, as seen, for example, in FIGURE 2. All four casters of the lifting dolly according to the present invention are interchangeable.

The support 1 is provided at one end with a tongue 25 which protrudes from the end of the support at a level slightly higher than the support center channel. This tongue can be made of a separate member, welded to the top of the support, or be formed or shaped from the support itself as shown. The tongue is provided with a hole 22 which is suitable for receiving a connecting pin.

The other end of the support is provided with a similarly situated hole 21 of the same diameter as hole 22. This hole 21, together with a connecting pin, forms means by which the tongue 25 of another dolly support may be coupled to the presently illustrated support 1 end to end. The tongue, being slightly higher than the level of the channel of the support, can slide over the channel to align hole 22 with hole 21, and permit the connecting pin to be inserted through both holes together.

Sections of the angle bar 5 are attached to each end of the support 1 transversely to the direction of the support so as to form a receptacle for a twisting lever 9. As may be seen in FIGURE 5 which illustrates one end of the lifting dolly shown in FIGURE 1 in greater detail, one longitudinal edge 6 of the section of angle bar 5 is welded to the underside of the support 1 so that one side 7 of the bar points toward the end of the support 1 forming a receptacle 8 for the twisting lever 9. A plug 10 is provided to prevent the twisting lever 9 from accidentally slipping out of the mouth of the receptacle 8.

The plug 10 is slidably mounted in the support 1. When the plug 10 is in the upper position, its head 11 fits into a recess 12 in the support 1. The recess 12 is deep enough so that the top of the head does not project beyond the underside of the support when the plug 10 is in the upper position. It thus insures that when the plug 10 is in the upper position it does not constrict the mouth of the receptacle 8.

The twisting lever 9 has at least one flat portion or recess 13 near both its ends in which a plug 10 may be inserted to keep it from slipping longitudinally out of the receptacle.

FIGURE 2 illustrates in top view one application of the present invention, whereby two identical lifting dollies are joined together side by side by means of a single twisting lever 9. When joined to each lifting dolly by means of a plug 10, as described above in conjunction with FIGURE 5, the lever 9 not only impedes the relative movement of one lifting dolly to the other, it also provides means to which a towing device may be conveniently connected for pulling this floor cart. Twisting lever 9 may thus be provided with an eyelet 14, a lug, or any other convenient connecting device.

Figure 6:
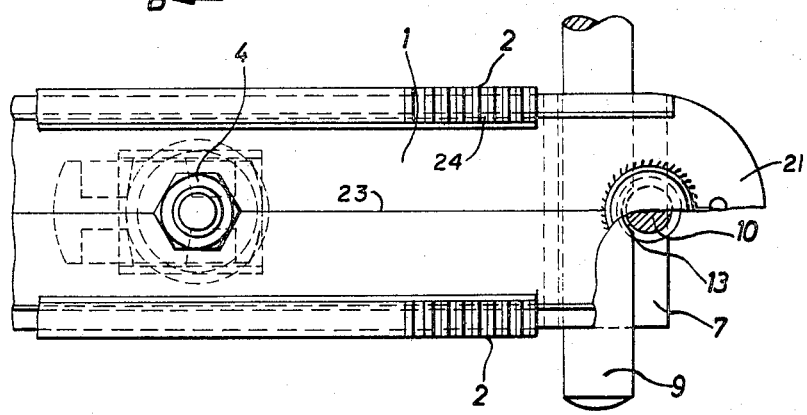
FIGURE 6 is a partially phantom top view of one end of the lifting dolly according to the present invention.

FIGURE 6 shows in top view the end of the lifting dolly shown in FIGURE 5. This end is representative of the left end of the dolly shown in FIGURES 1 and 2; that is, the end which includes hole 21 for coupling dollies end to end. The object-carrying edge 2 is shown with teeth 24 on its upper surface which increases the friction between the dolly and the object thus lowering the danger that the object will slide off the dolly while being transported.

The support shown in FIGURE 6 is made of two profile bars joined longitudinally together along line 23 by means of a weld. The support can also comprise a single channel bar with its channel facing upward.

Figure 7:
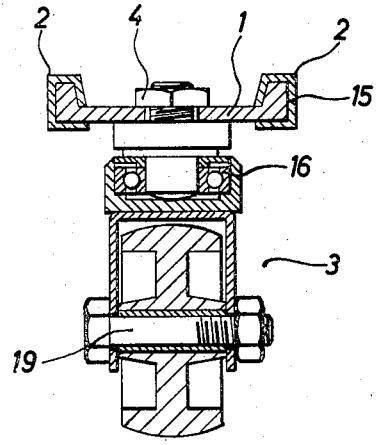
FIGURE 7 is a cross-sectional view of a dolly caster taken in section A–B of FIGURE 5.

FIGURE 7 is a cross-sectional view of the lifting dolly taken through section A–B of FIGURE 5. This figure discloses a plastic layer 15 on the flange of the channel bar support 1, that, like the teeth 24 shown in FIGURE 6, is extended around to the lower side of the support to insure that it remains in place. This layer insures a high friction surface for the carried object.

The caster 3 shown in FIGURE 7 is provided with ball bearings 16 for rotation in the vertical axis. The caster wheel is preferably made of plastic and easily replaceable by means of a nut and bolt 19.

The essential phases of operation of the lifting dolly are illustrated in FIGURES 3 and 4. As may be seen in FIGURE 3, the first step in lifting a pallet 17 is the insertion of one lifting dolly underneath the pallet 17 near each of its two longitudinal sides. The lifting dollies must be inserted flat on their sides so as to bring them within the internal clearance 20 of the pallet 17. A twisting lever 9 is next inserted in the receptacles 8 provided in the support 1 of both lifting dollies. A force is applied first to one lever 9 and then the other to twist the lifting dollies in the directions denoted by the arrows 18.

When the object-carrying edge 2 of one of the lifting dollies comes in contact with the underside of the pallet 17, the casters 3 of that dolly will swivel so that their wheel axes 19 run parallel to the carrying edge 2, as shown at the left side of FIGURE 4. As the lifting dolly is further twisted in the direction of the arrows 18, the casters will roll until both carrying edges 2 of the support 1 come in contact with the underside of the pallet. Because the total height of the lifting dolly is greater than the internal clearance 20 of the pallet 17 when the lifting dolly is in its final position as shown on the right side of FIGURE 4, the dolly carries the pallet. Since in its position parallel to the carrying edges of the support the caster wheel axle 19 lies between vertical planes erected at the outside of the carrying edges, the lifting dolly will pass through a top dead center position when twisted prior to reaching the position shown at the right side of FIGURE 4. A lifting dolly in the upright position underneath the pallet is, therefore, stable and needs no additional means of support.

As may be seen from the discussion above, the lifting dolly according to the present invention is much simpler and easier to operate than similar dollies presently known in the art. This dolly is also of robust and extremely simple construction and, after use, requires little storage room. In contrast to the dollies known in the prior art, the lifting dolly according to the invention requires no members at right angles to the lower carrying surface for supporting the sides of transportable objects such as boxes. As has been described above, sufficient stability is achieved by means of the carrying surface alone.

The lifting dolly of the present invention is, of course, not limited in application to the flat pallets mentioned above and shown in FIGURES 3 and 4. It is also possible, for example, to conveniently lift and transport a stack of lumber resting on two or more support beams. It is only necessary to insert the lifting dolly in a direction transverse to the longitudinal reach of the pieces of lumber.

It is possible to arrange a number of lifting dollies according to the invention both in parallel side by side and in series end to end with the support 1 facing downward toward the floor to form a roller-type conveyor. Such a conveyor has the advantage that it can be placed underneath resting objects wherever they are found without the aid of additional lifting apparatus. The lifting dolly members of the conveyor need only be shoved under the goods to be conveyed, then twisted in a manner similar to that described in connection with FIGURES 3 and 4, but so that the support 1 faces down and the underside of the goods comes into direct contact with the caster wheels. The goods can then be made to roll over the wheels in any manner desired.

It will be understood that the above description of the present invention is susceptible to various modifications, changes, and adaptations.

What is claimed is:

1. As a lifting device for lifting an object having a predetermined floor clearance, a dolly usable as one of a set of dollies, said dolly being capable of being inserted under the object and twisted, thereby lifting the object, and comprising, in combination:
    (a) support means having two approximately parallel upper edges suitable for carrying said object, which are spaced apart a given distance which is less than said floor clearance;
    (b) at least two wheels arranged on the bottom of said support means, the distance from the bottom of each of said wheels to the top of said upper edges being greater than said floor clearance, each wheel being rotatable about an axis which, when the dolly is upright, is horizontal and, after said dolly has been twisted thereby to lift said object and stands upright, is parallel to said two edges and lies between the two vertical planes passing, respectively, through the outermost part of said two edges; and
    (c) lever means, arranged on said support means approximately transverse to said upper edges, for twisting said support means into and out of said upright position.

2. A dolly as defined in claim 1, wherein said lever means is a removable twisting lever which may be attached to said support by means of a plug-in connection, the length of said lever being approximately transverse to the length of said upper edges.

3. A dolly as defined in claim 1 wherein the carrying surfaces of said upper edges are roughened thereby to increase the friction between said edges and said object.

4. A dolly as defined in claim 1 wherein the carrying surfaces of said upper edges are toothed thereby to increase the friction between said edges and said object.

5. A dolly as defined in claim 1 wherein said upper edges are made of a material having a high coefficient of friction.

6. A dolly as defined in claim 1 wherein said upper edges are ridges protruding from the top surface of said support means.

7. A dolly as defined in claim 1 wherein said support means comprises a channel bar, which, when said dolly is upright, has its channel facing upward.

8. A dolly as defined in claim 1 wherein said support means comprises two parallel profiled bars spaced apart a given distance and joined together.

9. A dolly as defined in claim 1 wherein said at least two wheels are a plurality of wheels distributed along the length of the bottom of said support means.

10. A dolly as defined in claim 1 wherein each of said wheels is arranged along the axis of symmetry of the bottom of said support means.

11. A dolly as defined in claim 1 wherein each of said wheels is a caster the swivel axis of which, when said dolly is upright, is vertical.

12. A dolly as defined in claim 1 wherein said support means includes means for coupling a plurality of said dollies end to end.

13. A dolly as defined in claim 12 wherein said coupling means is a tongue.

14. A dolly as defined in claim 1 wherein said support means includes a tongue which is attached to said support means and extends beyond one end of said support means, and means attached to the other end of said support means for fastening a similar tongue attached to another one of said dollies to said support means.

15. A dolly as defined in claim 13 wherein said tongue is an integral part of said support.

16. A dolly as defined in claim 1, further comprising means for detachably coupling two of said support means side by side.

17. A dolly as defined in claim 2, further comprising means for detachably coupling two of said support means side by side, said coupling means including said twisting lever and a detachable plug-in connector at each end of said support means for holding said lever.

18. A dolly as defined in claim 17 wherein said plug-in connector includes movable plug means and said twisting lever includes at least one recess for receiving said plug means whereby said plug may be inserted in said recess to fix said lever in said plug-in connector.

19. A dolly as defined in claim 18 wherein said plug-in connector further includes bearing means for holding said plug and wherein said plug includes stop means to limit its motion in the axial direction, whereby said plug is slidable within said bearing means in the axial direction to a limited extent.

20. A dolly as defined n claim 19 wherein said bearing means is a bushing.

21. A dolly as defined in claim 19 wherein said plug-in connector includes a section of angle bar arranged on the underside of both ends of said support means, respectively, the length of said angle bar being transverse to the length of said support means and the edge of one side of angle bar being attached to said support means in such a way that the other side of said angle bar points slightly upward, when said dolly is upright, and horizontally toward the direction of the respective end of said support means.

22. A dolly as defined in claim 17 wherein said twisting lever includes means approximately equidistant from both ends by which said two support means may be drawn.

23. A dolly as defined in claim 22 wherein said drawing means is an eyelet.

References Cited

UNITED STATES PATENTS

| | | | |
|---|---|---|---|
| 2,461,479 | 2/1949 | Moffat | 280—43.17 |
| 2,629,584 | 2/1953 | Cannon | 254—120 |
| 2,978,257 | 4/1961 | Barker | 280—47.32 |
| 3,170,708 | 3/1965 | Miller | 280—47.32 |

LEO FRIAGLIA, Primary Examiner

JOEL E. SIEGEL, Assistant Examiner

U.S. Cl. X.R.

254—120